United States Patent [19]

Seitz

[11] Patent Number: 5,231,117
[45] Date of Patent: * Jul. 27, 1993

[54] HIGH SOLIDS CB PRINTING INK WHICH PRODUCES A BLACK IMAGE

[75] Inventor: Michael E. A. Seitz, Dayton, Ohio

[73] Assignee: The Standard Register Company, Dayton, Ohio

[*] Notice: The portion of the term of this patent subsequent to Dec. 26, 2006 has been disclaimed.

[21] Appl. No.: 584,904

[22] Filed: Sep. 19, 1990

Related U.S. Application Data

[63] Continuation-in-part of Ser. No. 392,488, Aug. 11, 1989, abandoned, which is a continuation of Ser. No. 141,632, Jan. 7, 1988, Pat. No. 4,889,877.

[51] Int. Cl.$^5$ .................................................. C09D 5/00
[52] U.S. Cl. ................................... 523/161; 503/207; 264/4.7
[58] Field of Search .................. 523/161; 503/207; 264/4.7

[56] References Cited

U.S. PATENT DOCUMENTS 4,171,981 10/1979 Austin et al. .
4,755,501 7/1988 Chang et al. .
4,940,738 7/1990 Seitz .

*Primary Examiner*—Joseph L. Schofer
*Assistant Examiner*—Peter D. Mulcahy
*Attorney, Agent, or Firm*—Killworth, Gottman, Hagan & Schaeff

[57] ABSTRACT

A high solids content, aqueous, microcapsule-containing printing ink is prepared by forming microcapsules in situ in a printing ink vehicle. The microcapsules are preferably prepared by interfacial polymerization or interfacial crosslinking between a reactant, such as a polyisocyanate dissolved in an oily solution and a co-reactant such as a polysalt of casein and diethylene triamine present in an aqueous solution into which the oily solution is dispensed. The aqueous solution contains water and preferably a non-volatile diluent such as a non-reducing sugar, for example methyl glucoside. The oil-containing microcapsules contain an oil solvent and a mixture of dye precursors which upon reaction with a color developer produces an intense black image. The printing ink preferably has a 60-70% by weight solids content and may be used as a low-coat-weight CB coating for preparing carbonless copy paper.

7 Claims, No Drawings

HIGH SOLIDS CB PRINTING INK WHICH PRODUCES A BLACK IMAGE

CROSS REFERENCE TO RELATED APPLICATIONS

This is a continuation-in-part of application Ser. No. 392,488, filed Aug. 11, 1989 now abandoned, which in turn is a continuation of application Ser. No. 141,632, filed Jan. 7, 1988 (now U.S. Pat. No. 4,889,877, issued Dec. 26, 1989), the disclosures of which are hereby incorporated by reference.

FIELD OF THE INVENTION

The present invention relates to a high solids content, aqueous, microcapsule-containing, printing ink which upon rupture of the microcapsules and reaction of the dye precursor will produce a black image. More particularly, the present invention relates to a high solids content, aqueous, CB printing ink which produces a black image and which may be press-applied in the production of carbonless copy paper.

BACKGROUND OF THE INVENTION

In the manufacture of pressure-sensitive recording papers, better known as carbonless copy papers, a layer of pressure-rupturable microcapsules containing a solution of colorless dyestuff precursor, also known as a dye precursor, is normally coated on the back side of the front sheet of paper of a carbonless copy paper set. This coated backside is known as the CB coating. In order to develop an image or copy, the CB coating must be mated with a paper containing a coating of a suitable color developer, also known as dyestuff acceptor, on its front. This coated front color developer coating is called the CF coating. The color developer is a material, usually acidic, capable of forming the color of the dyestuff by reaction with the dyestuff precursor.

Marking of the pressure-sensitive recording papers is effected by rupturing the capsules in the CB coating by means of pressure to cause the dyestuff precursor solution to be exuded onto the front of the mated sheet below it. The colorless or slightly colored dyestuff, or dyestuff precursor, then reacts with the color developer in the areas at which pressure was applied, thereby effecting the colored marking. Such mechanism for the technique of producing pressure-sensitive recording papers is well known.

Among the well known color developers used on CF record sheets are phenolic-type resins, such as acetylated phenolic resins, salicylic acid modified penolics and, particularly, novolac type phenolic resins.

Among the well known basic, reactive, colorless chromogenic dye precursors useful for developing colored marks when and where applied to a receiving sheet coated with such color developers are Crystal Violet Lactone (CVL), the p-toluenesulfonate salt of Michler's Hydrol or 4,4'-bis(diethylamino)benzhydrol, Benzoyl Leuco Methylene Blue (BLMB), Indolyl Red, Malachite Green Lactone, 8'-methoxybenzoindoline spiropyran, Rhodamine Lactone, and mixtures thereof.

It is also known that various dye precursors can be mixed in order to produce a black image. See, for example, Kimura U.S. Pat. No. 3,551,181, which suggests combining a red-purple forming agent or a blue forming agent with the particularly disclosed orange-yellow one in order to obtain a black copy. However, to date, production of a high quality black image has been difficult to achieve with a microencapsulated dye precursor.

Microencapsulation has been used in the production of carbonless copy papers for some time. One of the major techniques involves phase separation from an aqueous solution. The complex coacervation process (U.S. Pat. No. 2,800,457 and others) falls into this category. Another method of producing CB microcapsules involves interfacial polymerization or interfacial crosslinking. See, for example, Kan patent No. 3,432,327 wherein a large number of reactants and coreactants are designated for use in interfacial polymerization. Finally, an improvement on the interfacial polymerization method of encapsulation is found in my patent No. 4,898,780, issued Feb. 6, 1990, which is hereby incorporated by reference. That improvement involves reacting a crosslinking agent, such as a polyisocyanate, dissolved in the oily solution phase with a polysalt made up of a high molecular weight polyanion, such as casein, and a low molecular weight polycationic polyamine, dissolved in the aqueous solution phase. That process results in microcapsules which are thicker and stronger than microcapsules produced by ordinary interfacial polymerization.

Whichever encapsulation method is used, a problem remains in terms of the ink vehicle and CB coating method. According to the oldest prior art concerning the technology of CB coating, such coating was carried out with an aqueous coating composition over the entire surface of the substrate, as shown in German Offenlegungsschrifts Nos. 1,934,437 and 1,955,542. The process described in these patents has the disadvantage that, following application of the coating composition, the water is evaporated and this requires a considerable input of energy. Additionally, the need for drying requires the use of a complex and expensive apparatus for an aqueous coating composition. Another problem concerns removal of the polluted water which emanates from production and from the purification of the aqueous coating composition.

If volatile organic solvents are used in the production of the coatings, the excess solvent also has to be evaporated in order to dry the coating. This results in the formation of solvent vapors which are particularly dangerous.

There are also numerous known processes for applying coating compositions to a paper substrate. According to the prior art, aqueous or solvent-containing coatings may be applied to a paper substrate by rotogravure or flexoprinting, as shown in U.S. Pat. Nos. 3,016,308 or 3,914,511. These processes also have the disadvantage that the coatings must be subsequently dried. For these reasons, it was proposed, as shown in U.S. Pat. Nos. 3,079,351 and 3,684,549, to take up the microcapsules in waxes and to coat the paper substrate with hot melt systems of this type. See also, U.S. Pat. Nos. 4,112,138 and 4,097,619 which disclose processes for the application of microcapsules to paper by means of a non-aqueous solvent-free hot melt system, or by means of a radiation-curable system. In U.S. Pat. No. 4,161,570 microcapsules are added to a radiation-curable substance without first spray-drying. Although these proposed measures avoid removal of the solvents, the wax-like coating changes the character of the paper because relatively large quantities of wax must be applied.

Accordingly, it remains more desirable to use an aqueous-based CB ink if the solids content of that ink is high enough to avoid the problems found with typical aqueous-based CB inks. The major problem with aqueous CB inks is the large drying capacity required. For example, a 45% solids content CB printing ink has a 55% water content which dictates the use of a large amount of energy to dry the coating. In a typical CB coating at 1.25 lbs/ream dry weight (which contains 1.0 lbs/ream capsules), the coating must be applied at 2.78 lbs/ream wet (i.e. 1.25 lbs/ream divided by 0.45). That means that around 1.5 lbs/ream of water must be removed. In addition, when this much water is added to a sheet, numerous controls must be added to the coater to prevent sheet distortions like curl or cockle. Special grades of paper are also required to avoid excessive penetration and web breaks on the coater. The result is a coater and accompanying facilities that are very expensive to build and operate. The centralization of production, due to high capitalization costs, also produces cost inefficiencies in the form of high scrap levels and transportation costs. All of these factors add to the cost of the CB coated sheet.

In order to overcome these problems there have been various proposals for production of high solids content, aqueous CB printing ink. For example, in Jabs U.S. Pat. No. 4,428,978 there is disclosed a process for the production of aqueous suspensions containing from 35 to 60% by weight of microcapsules prepared by interfacial polyaddition from polyisocyanates and H-active compounds, wherein a)an isocyanaurate-modified aliphatic polyisocyanate is used as the polyisocyanate, and b) the suspension is adjusted to a PH value of less than 7 after the polyaddition reaction. It is disclosed that the suspensions may be converted into agglomerate-free capsule powders, for example by spray drying, or the suspensions may be used directly for the production of aqueous flexograph pastes and concommittently the production of completely or partly coated carbonless copy papers by flexograph process printing. The preferred aqueous solution phase as shown in the examples in Jabs is a polyamine dissolved in water, to which an aqueous acid is added after the polyaddition reaction takes place.

Another patent which discusses high solids content, aqueous-based, CB printing inks is Vassilliades U.S. Pat. No. 4,138,362. Vassilliades discloses producing microcapsules by admixing a water-immiscible, oily material containing an oil-soluble, non-polymeric polyfunctional isocyanate cross-linking agent, and an aqueous solution of a polymeric emulsifying agent in the form of a water-soluble polymer containing recurring-$NH_2$ or=NH groups or a water-soluble natural gum containing recurring hydroxy groups. A water-in-oil emulsion is formed and a solid capsule wall is formed by the cross-linking of the emulsifying agent by the isocyanate. When the emulsion contains a natural polymeric emulsifying agent, a viscosity lowering agent in the form of a urea-formaldehyde or alkali metal periodate may be added in order to obtain a higher solids coat weight while at an efficient coating viscosity. The preferred aqueous solution phase as shown in the examples in Vassilliades is an aqueous chitosan or gelatin-mixed solution containing a water-soluble urea-formaldehyde prepolymer. In the case of casein, the capsules produced by the Vassilliades method are extremely poor. The capsules are very fragile, due to a very thin wall, and exhibit poor aging as a result of a steady release of the solutions they contain.

Despite these teachings, processes for printing microcapsules in coating compositions on offset printing machines or even book printing machines were heretofore regarded as unworkable because both in the production of the printing ink and in the distributor rollers of the printing machine and during the printing process, shearing and compressive forces would destroy most of the microcapsules. A process for producing printing inks which may be press applied is described in U.S. Pat. No. 4,404,251, referred to previously, in which formed microcapsules are formulated into the printing ink composition either by stirring the aqueous dispersion of microcapsules directly in the binder and subsequently removing the water in vacuo (the so-called flushing process), or by spray-drying the microcapsules and then adding to the binder. These processes require special equipment and are not entirely satisfactory. In the former process, the hydrophilic nature of the microcapsules may make direct incorporation into the binder very difficult. The spray-drying technique is very costly. Furthermore, during spray-drying some capsules inevitably aggregate which results in a large particle size distribution. The aggregates can easily reach 100 microns or more, and once formed are virtually impossible to break up non-destructively to the capsule. Such large particles are quite unsuitable for inks.

Accordingly, the need remains for an improved high solids content, aqueous, CB printing inks which are capable of producing a black image.

SUMMARY OF THE INVENTION

That need is met by the present invention which provides a process for making a high solids content, aqueous, microcapsule-containing printing ink by preparing a dispersion of microcapsules (microcapsule slurry) in the ink vehicle itself. The result is a complete CB printing ink with a solids content preferably in the range of approximately 60–70% by weight.

The microencapsulation method is preferably an interfacial polymerization or interfacial crosslinking one wherein a reactant, preferably a crosslinking agent such as a polyisocyanate, is dissolved in an oily solution which will serve as the internal phase of the microcapsules. Thus, for a CB ink, the oily solution will contain an oily solvent and a dye precursor capable of reacting with a color developer in order to form a color, preferably black. The crosslinking agent is dissolved in that oily solution.

The oily solution having the crosslinking reactant and dye precursors dissolved therein is, then, dispersed into an aqueous solution to form an emulsion. A coreactant may be added either before or after emulsification. In any event, as is known, the reactant and coreactant react in the emulsion by an interfacial polymerization or interfacial crosslinking mechanism to form a hard thick capsule wall around droplets of the oily solution and produce microcapsules. Preferably, the coreactant is a polysalt of the type disclosed in my earlier U.S. Pat. No. 4,898,780. As disclosed therein a polysalt includes a high molecular weight polyanion, such as casein, and a polycationic polyamine having a molecular weight of less than 1200 and having a functionality of at least three, such as diethylene triamine.

One means for producing the high solids content printing ink of the present invention is the use of a non-volatile diluent in the aqueous solution as a co-solvent along with water. The non-volatile diluent should be soluble in water (i.e. greater than about 33% solubility in water), immiscible in the oily solution, non-reactive with the reactant and coreactant capsule wall materials, and have a low viscosity (i.e. less than approximately 50 cps). Preferably, the non-volatile diluent should also be relatively non-hygroscopic, be a non-plasticizer for the capsule wall, have a vapor pressure of less than about 0.1 mm Hg, and be essentially tack free when dried. The preferred non-volatile diluents are non-reducing sugars such as methyl glucoside, but other materials such as dimethyl urea, dimethyl hydantoin formaldehyde resin, and sorbitol, erythritol, and polyoxyethylene polyols such as Carbowax 4000 can also be used.

The preferred dye precursor composition of the present invention is also an important feature in that it is capable of producing a black image when reacted with a color developer. Preferably the dye precursor composition is a mixture of green, red, blue and black dye precursors dissolved in the oily solvent. The combined total of all dye precursors in the oily solvent may range from 10% to 30% based on the oily solvent. The relative weight percent amounts are 16 to 39, preferably 23%, green; 7 to 25, preferably 14.5%, red; 3 to 10, preferably 6%, blue, and 33 to 67, preferably 56.5%, black. The dye precursor mixture may be present in the amount of 4–11% by total weight of the printing ink. When used in the higher amounts, i.e., in the range 6 to 11%, it is possible to reduce the non-volatile diluent content or even eliminate it. Thus in one embodiment of the invention no non-volatile diluent is used.

In this embodiment, the printing ink will contain an oily solvent present in an amount of 28 to 38% by weight (all percentages are on the total weight of printing ink) and the dye precursors at 6 to 11%. The wall forming reactant dissolved in the oily solution is preferably present in an amount ranging from 1 to 3.5%. In the aqueous solution there is 54 to 43% water and 0–12% non-volatile diluent. The wall forming co-reactant, which may be dissolved in the aqueous phase before or after the emulsification, is preferably present in an amount ranging from 0.3 to 1.5%. The protective colloid blend (discussed below) is present in an amount ranging from 4% to 8%.

When the non-volatile diluent is not used, the resulting printing ink will have as the preferred ingredients: 52.0% water, 0.0% non-volatile diluent, 39.5% oil containing microcapsules, 6.0% protective colloid blend, and 2.5% miscellaneous ingredients such as defoamers, slip agents, and preservatives. The CB printing ink so formulated can be coated at an extremely low cost weight of around 0.3#/R (17×22) dry weight, and still produce a good image. A density of 0.40 on an Answer II (Macbeth, a division of Kollmorgen Corp. of New York) Densitometer is obtained in 5 minutes after calendering at 38 pounds per square inch.

It has been found that when a dye precursor mixture of this type is used, upon rupture of the microcapsules and reaction with a color developer, a particularly deep black image is produced.

Another important, but optional, feature of the present invention is the inclusion of a high concentration of a blend of protective colloids and/or binders (hereinafter referred to alternatively and collectively as "protective colloid blend") in the printing ink in order to obtain the good transfer properties required to apply the printing ink at low coat weights. Normally a high concentration of protective colloid or binder reduces the intensity of color formed with the CB dye precursor. In the present invention that reduction is avoided through the use of blends of hard, brittle, poor-film-forming polymers or resins with soft, pliable, film-forming ones. The protective colloid blend is preferably a mixture of two or more of the following materials: styrene-maleic anhydride copolymers, methyl vinyl ether-maleic anhydride copolymers, styrene-maleic ester copolymers, methyl vinyl ether-maleic ester copolymers, carboxymethyl-cellulose, casein, polyvinyl pyrrolidone, acrylic resins, and styrenated acrylic resins. As a further optional feature, a binder emulsion such as a styrene/acrylic or a styrene/butadiene latex or alkali (usually ammonia) soluble resin such as an acid modified rosin resin or a low molecular weight acrylic resin or styrene maleic anhydride resin may be added to the ink at the end of process to improve the moisture resistance and drying rate of the printing ink.

In the embodiment containing a non-volatile diluent, the oily solution contains an oily solvent present in an amount of 23–43% (all percentages being based on the total weight of the printing ink) and 4.5–6.5% of the dye precursor. The crosslinking reactant dissolved in the oily solution preferably is present in an amount ranging from 1 to 3.5%. In the aqueous solution preferably there is found 24–40% water and 12–25% (most preferably 13–20%) non-volatile diluent. The coreactant which may be dissolved in the aqueous solution and added before emulsification or added after emulsification, preferably is present in an amount ranging from 0.3 to 1.5%. If used, the optional protective colloid blend may be present in an amount ranging from 4–8% and if used the optional binder emulsion or alkali soluble resin may be present in an amount ranging from 0.001 to 20.0%.

In this embodiment, the resulting printing ink thus will have as the preferred ingredients: 38% water, 16% non-volatile diluent, 36% oil-containing microcapsules, 6% protective colloid blend, 1.5% binder emulsion or alkali soluble resin, and 2.5% miscellaneous ingredients such as defoamers, slip agents, and preservatives. It has been found that a CB printing ink so formulated has both a high solids content and superior transfer properties that enable it to be coated at a low coat weight (i.e. about 0.5 lbs./ream of 17"×22" paper).

In either embodiment, the combination of these two features—high solids content and low coat weight—enables one to coat the present CB printing ink with only minimal amounts of water added to the sheet. For example, at a 0.5 lbs./ream dry coat weight of CB printing ink having a 65% solids content, 0.77 lbs./ream wet coating is applied (0.5/0.65=0.77). Therefore only 0.27 lbs./ream (0.77−0.5=0.27) of water is applied to the sheet along with the microcapsules. This represents more than 80% reduction in water content as compared to ordinary aqueous flexograph inks. The reduction is achieved through the formulation of the present invention, not through expensive drying or flushing processes. The small amount of water that is added to the sheet is insufficient to cause the sheet distortions that plague normal aqueous coatings. Only modest efforts are required to dry the CB coating of the present invention to a tack-free condition. A heated roll, air bar, or mini-box dryer is adequate to assist drying. As a result the CB printing ink of the present invention can be run on a simple flexo or offset gravure unit which can fit easily into an existing press line.

Accordingly, it is an object of the present invention to provide an improved high solids, aqueous, microcapsule-containing printing ink capable of producing a black image. These and other objects, features and attendant advantages of the present invention will become apparent to those skilled in the art from a reading of the following detailed description of the preferred embodiments and the appended claims.

DETAILED DESCRIPTION OF THE PREFERRED EMBODIMENTS

In either preferred embodiment, the printing ink of the present invention may be used to prepare CB coated carbonless copy papers using simple flexographic or offset gravure techniques. Since the preferred microcapsules are relatively strong they can withstand the pressures involved in such printing techniques without undue premature rupture.

The preferred microencapsulation method is that set forth in my earlier U.S. Pat. No. 4,898,780; although, as mentioned previously, other interfacial polymerization or interfacial crosslinking methods may also be used. As disclosed in my copending application, an oily solution of a dye precursor in an oily solvent and containing a crosslinking agent is emulsified into an aqueous solution of casein or other polyanion that has been dissolved in water using a weak base. A polyamine preferably with a functionality of 3 or more, and preferably having a molecular weight of less than 1200, is added either before or after emulsification.

The preferred polyamine also preferably has at least one active hydrogen available on at least two of the three amino groups. Examples of suitable polyamines are diethylenetriamine, triethylenetetramine, iminobispropylamine, bis(hexamethylene)triamine, polyoxypropylenetriamines, polyoxypropylenepolyamines, and amine epoxy adducts (hydroxyalkyl-substituted polamines).

The polyanion and polyamine form a complex or polysalt which serves as a coreactant for the crosslinking agent. The crosslinking agent, then, is the reactant which reacts with both segments of the polyamine-polyanion complex simultaneously, or with the polyamine segment causing the polyanion segment to precipitate concurrently, or by both mechanisms. Examples of appropriate crosslinking agent reactants are polyisocyanates, polyacid chlorides, polyanhydrides, polyepoxides, polychloroformates, or polyaldehydes. It has been found that the crosslinking agent works best in the system of the present invention when it contains a functionality of at least three.

Isocyanates suitable for this purpose are polyisocyanates and polyisocyanate prepolymers. The term "polyisocyanate" includes polyisocyanates and polyisothiocyanates. Examples of suitable oleophilic polyisocyanates include diisocyanates such as m-phenylenediisocyanate, p-phenylenediisocyanate, 2,6-tolylenediisocyanate, 2,4-tolylenediisocyanate, naphthalene-1,4-diisocyanate, diphenylmethane-4,4'-diisocyanate, 3,3'-dimethoxy-4,4'-biphenyldiisocyanate, 3,3'-dimethyldiphenylmethane-4,4'-diisocyanate, xylylene-1,4-diisocyanate, xylylene-1,3-diisocyanate, 4,4'-diphenylpropanediisocyanate, trimethylenediisocyanate, hexamethylenediisocyanate, propylene-1,2-diisocyanate, butylene-1,2-diisocyanate, ethylidynediisocyanate, cyclohexylene-1,2-diisocyanate, cyclohexylene-1,4-diisocyanate, xylylene-1,4-diisothiocyanate, ethylidynediisothiocyanate, hexamethylenediisocyanate, etc.; triisocyanates such as 4,4',4''-triphenylmethanetriisocyanate, toluene-2,4,6-triisocyanate, etc; and tetraisocyanates such as 4,4'-dimethyldiphenylmethane, 2,2',5,5'-tetraisocyanate, etc. Particularly preferred are the addition product of hexamethylene diisocyanate and hexane triol, the addition product of 2,4-toluene diisocyanate with pyrocatechol, the addition product of toluene diisocyanate with hexane triol, the addition product of toluene diisocyanate with trimethylol propane, the addition product of tetramethylxylene diisocyanate with trimethylol propane, the addition product of hexamethylene diisocyanate with trimethylol propane, or suitable polyisocyanates analogous to the compounds mentioned, or methylene (polyphenyl isocyanate).

Other usable modified isocyanates are those based on hexamethylene-1,6-diisocyanate, m-xylylene diisocyanate, 4,4'-diisocyanato-dicyclohexyl methane and isophorone diisocyanate which contain at least two functional isocyanate groups per molecule. Polyisocyanates based on derivatives of hexamethylene-1,6-diisocyanate having a biuret structure, as disclosed in U.S. Pat. No. 4,051,165, or having an isocyanurate structure are also comprehended.

The oily solution into which the reactant is dissolved preferably contains an oily solvent such as any of the dye precursor solvents normally used in CB systems. Suitable materials include alkylated naphthalenes, alkylated biphenyls, chlorinated biphenyls, diphenyl methanes and ethanes, alkyl phthalates, and the like. Additional oily solvent materials which may be employed include the aliphatic and aromatic hydrocarbon oils such as kerosene, mineral spirits, naphtha, xylene, toluene, and the like.

Likewise, with a CB printing ink typical dye precursors may be used. These include triphenyl methane and diphenyl methane compounds including the well known leuco dyes, xanthene compounds, thiazine compounds, spiropyran compounds, and the like. However, in the preferred embodiment of the present invention the dye precursor is a mixture of leuco dyes in relative proportions such that when reacted with a color developer an intense black image is produced. Thus the preferred dye precursor mixture contains by relative weight percentage 39 to 16, and preferably 23%, of a green dye such as Pergascript I-GD Green from Ciba-Geigy of Greensboro, N.C.; 25 to 7, and preferably 14.5%, of a red dye such as Copiken XX Red from Hilton-Davis of Cincinnati, Ohio, 3 to 10, and preferably 6%, of a blue dye such as Copiken I Blue also from Hilton-Davis, and 33 to 67, and preferably 56.5%, of a black dye such as pergascript I-BR Black from Ciba-Geigy.

In one embodiment of the invention 6 to 11 of the dye precursor mixture is dissolved in 38 to 28 of the oily solvent. To this is added 1.0 to 5.0 of a cross-linking agent as described. In this instance, however, the aqueous solution is different from that described below in that no non-volatile diluent is added to it. Rather it contains 54-43% water, 4 to 8% protective colloid blend, 0.3 to 1.5% of a coreactant, and 2.5% miscellaneous ingredients.

In a preferred embodiment, as in the one just described, the aqueous solution which serves as both the aqueous emulsion phase for the microencapsulation process and the aqueous ink vehicle for the CB printing ink, preferably contains water and optionally a weak base such as sodium hydroxide, sodium tetraborate (borax), and the like, as is typical. However, unlike typical aqueous solutions used in interfacial polymerization or interfacial crosslinking, the aqueous solution of this embodiment also contains a non-volatile diluent.

The non-volatile diluent is used as a co-solvent with water to provide the liquid media for the encapsulation reaction. The properties it should possess include:

(i) Its solubility in water should be at least 33%.

(ii) The viscosity of its aqueous solution should be low, i.e. not greater than 50 cps. This effectively restricts the non-volatile diluent to low molecular weight species.

(iii) The relative chemical reactivity towards the capsule wall precursors (i.e. reactant and coreactant) should be negligible, that is, similar to water in that it does not participate in the wall forming reaction.

(iv) The non-volatile diluent cannot be miscible or soluble in the oily solution.

The above properties are important in terms of the substitution of non-volatile diluent for some of the water in the encapsulation process. In order for the final ink matrix of the CB printing ink to function adequately (in drying, imaging, and aging) additional desirable features include:

(v) The material should be non-hygroscopic (or only slightly). Otherwise, the non-volatile diluent will slow the water loss to such an extent as to cause tracking (incompletely drying).

(vi) The dried non-volatile diluent material should be essentially tack free.

(vii) The non-volatile diluent should not plasticize the protective colloid blend or the capsule wall. Unacceptable amounts of smudge (inadvertent discoloration) can occur from the CB material if this requirement is ignored.

(viii) The vapor pressure of the non-volatile diluent should be less than 0.1 mm Hg to avoid environmental restrictions and assure worker safety.

Preferred as the non-volatile diluent is a non-reducing sugar such as methyl glucoside. Other materials which may be used include selected polyols, amides, and ureas such as dimethyl urea, dimethyl hydantoin formaldehyde resin, sorbitol, erythritol, and polyoxyethylene polyols such as Carbowax 4000.

In terms of the preferred CB printing ink, it is also desirable to add to the microcapsule slurry a relatively high concentration of a protective colloid blend. The use of a relatively high level of a protective colloid blend insures the desired microcapsule particle size, which is that 95% of the capsules should be 5 microns or less for a 0.5 lbs./ream coating. The protective colloid blend also provides desirable barrier and mechanical properties for the CB coated sheet during handling and storage. Finally, as mentioned, the protective colloid blend is preferably a blend of hard, brittle, poor-film forming polymers or resins such as casein, styrene-maleic anhydride, styrene-maleic anhydride ester copolymers, styrenated acrylics and carboxymethyl cellulose with soft, pliable, film forming ones such as polyvinyl pyrrolidone, acrylic, methyl vinyl maleic anhydride copolymers, polyvinyl alcohol, and methyl vinyl ether-maleic ester copolymers. In this manner the mechanical hardness properties of the CB coated sheet can be adjusted to allow for fracture under the appropriate stress.

As a further modification a binder emulsion such as a styrene/acrylic or styrene/butadiene latex or an alkali (usually ammonia) soluble resin such as an acid modified rosin resin or a low molecular weight acrylic resin or styrene maleic anhydride resin may be added to the microcapsule slurry to improve the properties of the CB printing ink.

Generally, the total encapsulation mixture which will form the CB printing ink contains by weight approximately:

| Ingredient | Weight % |
|---|---|
| Oily solvent | 23–43 |
| Dye precursor(s) | .4.5–6.5 |
| Reactant/Coreactant | 1.0–5.0 |
| Protective Colloid Blend (optional) | 4–8 |
| Water | 24–40 |
| Non-volatile diluent | 0–25 |
| Base (optional) | 7–27 |
| Binder Emulsion or alkali soluble resin (optional) | 0.001 to 20 |

The resulting CB printing ink will have as its preferred ingredients in the approximate amounts by weight of:
38% water
16% non-volatile diluent
36% oil-containing microcapsules
6% protective colloid blend
1.5% binder emulsion or alkali soluble resin
2.5% miscellaneous ingredients The following examples will more clearly define the invention:

EXAMPLE I a) Oily Solution

In a 2 L beaker 33.25 g Pergascript I-GD Green, a dye precursor from Ciba-Geigy of Greensboro, N.C., 20.85 g Copikem XX Red, a dye precursor from Hilton-Davis of Cincinnati, Ohio, 8.5 g Copikem I Blue, also from Hilton-Davis, and 81.25 g Pergascript I-BR Black, also from Ciba-Geigy, were dissolved in 707.5 g diisopropyl naphthalene. The mixture was heated to 110° C. to effectively dissolve the dye precursors. After the dyes were dissolved, 93.75 g Norpar 13 Special, an aliphatic oily solvent from Exxon of Baytown, Tex., was added and the hot solution cooled to 25° C. At that point 45 g Desmodur N-3200, a biuret containing polyisocyanate from Mobay Chemical Corp. of Pittsburgh, Pa., was added and the mixture stirred until a clear solution was obtained.

b) Aqueous Solution

In a 4 L beaker containing 785 g of water, 87.5 g casein was added followed by 3.7 g of a 50% sodium hydroxide solution, and 3.2 g Borax. The mixture was heated to 60° C. and maintained for 30 minutes. The heat was turned off and 537.5 g Sta-Meg 104, a methyl glucoside non-volatile diluent from Horizon Chemical Corp. of Decatur, Ill., was added. After stirring for 15 minutes, 87.5 g polyvinyl pyrrolidone (PVP K-30, molecular weight 40,000) was added. The solution was then cooled to 30° C.

c) Encapsulation/Compounding Process

The aqueous solution (b) was placed in a Waring blender connected to a Variac. With the blender set on low and the Variac at 60%, the oily solution (a) was poured into the vortex within a period of 30 seconds. After the addition was complete, the Variac was set to 90%, and the blender was allowed to run for an additional 30 seconds. The emulsion was then transferred to the 4 L beaker, and stirred moderately to produce a slight vortex. Then 10.9 g diethylene triamine in 10.9 g water was added to the emulsion. The mixture was heated to 60° C. and held at that temperature for 2 hours. After cooling to room temperature, 62.5 g Neptune 1-N1, a micronized polyethylene wax slip agent from Shamrock Chemical Corp. of Newark, N.J., was added. The ink at 69% solids was diluted with water (around 225 g H₂O) to 62.5% solids. The viscosity was 600 cps at 24° C., pH=8.4. Defoamer, such as 50 g of SWS-213 silicone emulsion from SWS Company, may be added if needed. The capsule size is 3 microns. The CB printing ink will contain 60% capsules by dry weight. When coated at 0.5#/R (17×22), the CB coating is capable of producing an intense black image upon rupture of the microcapsules and contact of the dye precursor with a dye developer.

EXAMPLE II a) Oily Solution

An oily solution is made as in Example I except 60.5 g of Coronate EH, an isocyanurate-modified aliphatic polyisocyanate from Nippon Polyurethane Kogyo K.K. is used in place of the Desmodur N-3200.

b) Aqueous Solution

The aqueous solution is prepared as in Example I.

c) Encapsulation/Compound Process

The process is exactly as in Example I.

EXAMPLE III a) Oily Solution

In a 2 L beaker dissolve 36 g of Pergascript I-2GN Green 18.15 g of Pergascript I-6B Red, and 81.5 g of Pergascript I-BR Black (all available from Ciba-Geigy) in 726 g diisopropyl naphthalene. At room temperature, add a solution of 100 g of Cythane 3160, an addition product of tetramethylxylene with trimethylol propane from American Cyanamide, in 100 g diisopropyl naphthalene.

b) Aqueous Solution

In a 4 L beaker, add 87.5 g casein to 850 g water. Heat to 80°–85° C. and hold for 30 minutes. Cool to 60° C., and then add 28.5 g Jeffamine J-403, a polyfunctional amine from Jefferson Chemical, and 3.2 g of Borax. Stir until the casein dissolves. Add 450 g of Sta-Meg 104, a methyl glucoside non-volatile diluent from Horizon Chemical Corp., and 87.5 g of polyvinyl-pyrrolidone (40,000 molecular weight). Cool the solution to room temperature.

c) Encapsulation/Compounding Process

The process is the same as in Example I except that no diethylene triamine is added.

EXAMPLE IV a) Oily Solution

The oily solution is prepared as in Example I, except that 91.6 g of Huls adduct EXP-121-9, an adduct of hexamethylene diisocyanate with trimethylol propane from Huls Chemische Werke, is used in place of the Desmodur N-3200.

b) Aqueous Solution

The aqueous solution is prepared as in Example III except that 10.9 g of diethylene triamine is used instead of the Jeffamine T-403.

c) Encapsulation/Compounding Process

The process is the same as in Example I except that no diethylene triamine is added at this stage.

EXAMPLE V a) Oily Solution

In a 2 L beaker, 94.66 g of Pergascript I-2GN Green (a dye precursor from Ciba-Geigy of Greensboro, N.C.) 51.9 g of Pergascript I-6B Red, 19.4 g of Pergascript I-2R Blue, and 111 g of BK202 (a black dye precursor from Yamada of Kyoto, Japan) were dissolved in 747.5 g of diisopropyl naphthalene. The mixture was heated to 118° C. to dissolve the dye precursors. After the dyes were dissolved, the solution was cooled to 55° C. At this point, 45 g of Desmodur N-3200 (also called Baymicron 2107) available from Mobay, was added and the mixture stirred until a clear solution was obtained. The temperature of the solution was then adjusted to 45° C.

b) Aqueous Solution

In a 4 L beaker containing 1225 g of water, 58.3g of casein was added followed by 2.5 g of 50% sodium hydroxide solution and 2.2 g Borax. The mixture was heated to 60° C. and maintained for 30 minutes. The 47.3 g of polyvinyl pyrrolidone with a molecular weight of 40,000 (PVP-K30), 11 g of 360,000 molecular weight polyvinylpyrrolidone (PVP-K90) and 5 g of Luvishol VA 64 [a 60:40 vinyl pyrrolidone-vinyl acetate copolymer from BASF of Ludwigshofen, West Germany; (molecular weight 40,000)] were added.

The mixture was stirred until the polymer dissolved, then the solution was cooled to 55° C.

c) Encapsulation/Compounding Process

The aqueous solution (b) was placed in a Waring blender connected to a Variac. With the blender set on high and the Variac at 60%, the oily solution (a) was poured into the vortex within a period of 45 seconds.

The emulsion is then transferred to the 4 L beaker, and stirred moderately to produce a slight vortex. Then 10.9 g of diethylene triamine in 10.9 g water was added to the emulsion. The mixture was heated to 60° C. and held at that temperature for 2 hours. After cooling to room temperature, 75.5 g of Michem Emulsion 32535 (a polyethylene emulsion from Michelman of Cincinnati, Ohio) and 2.5 g of SWS-213 silicone emulsion were added.

The ink contains (1288.75/2515.86 =) 51.2% water, 29.7% diisopropylnaphthalene, and 11% dye on total weight. The capsule size is around 3 microns. When the CB ink is coated at 0.61#/R wet, a 0.3%/R (17×22) dry CB film is deposited which is capable of producing an intense black image when impressioned against a CF paper. Only 0.31#/R water must be removed to dry the coating, even though no non-volatile diluent was used.

It will be obvious to those skilled in the art that various changes may be made without departing from the scope of the invention which is not to be considered limited to what is described in the specification.

What is claimed is:

1. A high solids content, aqueous, microcapsule-containing printing ink having a solids content of 60–70% by weight, comprising:

an aqueous solution containing waster and a non-volatile diluent, said non-volatile diluent being selected from the group consisting of methyl glucoside, dimethyl urea, dimethyl hydantoin formaldehyde resin, sorbitol, erythritol, and polyoxyethylene polyols, and oil containing microcapsules dispersed in said aqueous solution, said oil-containing microcapsules containing an oily solvent and a dye precursor capable of reacting with a color developer in order to form a black color, said dye precursor consisting of a mixture of green, red, blue and black dye precursors.

2. The printing ink of claim 1 wherein said dye precursor is present in said microcapsules with said oily solvent in a ratio of 4.5–6.5 parts by weight dye precursor to 23–43 parts by weight oily solvent.

3. The printing ink of claim 1 further including a latex binder emulsion or an alkali soluble resin.

4. The printing ink of claim 1 wherein said dye precursor mixture comprises by weight 39 to 16% green dye precursor, 25 to 7% red dye precursor, 3 to 10% blue dye precursor, and 33 to 67% black dye precursor.

5. A high solids content, aqueous, microcapsule-containing printing ink having a solids content of approximately 43 to 54% by weight, comprising:

an aqueous solution, and oil-containing microcapsules dispersed in said aqueous solution, said oil-containing microcapsules containing 28 to 38% by weight of the printing ink of an oily solvent and 6 to 11% by weight of the printing ink of a dye precursor mixture capable of reacting with a color developer to form a black color, said dye precursor mixture consisting of a mixture of green, red, blue and black dye precursors.

6. The printing ink of claim 5 wherein said dye precursor mixture consists by weight of 39 to 24% green dye precursor, 25 to 16% red dye precursor, 3 to 10% blue dye precursor, and 33 to 50% black dye precursor.

7. The printing ink of claim 5 further containing a latex binder emulsion or an alkali soluble resin.

* * * * *